Aug. 25, 1964     C. E. HURLBURT     3,146,433
MEANS FOR MONITORING THE OPERATING SPEED OF A MOTOR
Filed May 20, 1963     3 Sheets-Sheet 1

INVENTOR.
CHARLES E. HURLBURT
BY
ATTORNEY

Aug. 25, 1964    C. E. HURLBURT    3,146,433
MEANS FOR MONITORING THE OPERATING SPEED OF A MOTOR
Filed May 20, 1963    3 Sheets-Sheet 3

INVENTOR.
CHARLES E. HURLBURT
BY
ATTORNEY

United States Patent Office 3,146,433
Patented Aug. 25, 1964

3,146,433
MEANS FOR MONITORING THE OPERATING
SPEED OF A MOTOR
Charles E. Hurlburt, River Edge, N.J., assignor to The
Bendix Corporation, Teterboro, N.J., a corporation of
Delaware
Filed May 20, 1963, Ser. No. 281,573
11 Claims. (Cl. 340—263)

The invention relates to improved means for monitoring the operating speed of a motor, and more particularly to a novel means for monitoring or effecting a test of the speed of an electric motor for driving the rotor of a gyroscope.

Heretofore, instances of rotor bearing failure in gyroscopes have occurred causing inaccuracies in the operation of the gyroscope. Moreover, such instances of bearing failure have occurred under flight conditions of the aircraft in which the pilot was using the gyroscope in overcast weather so that the precession of the gyroscope caused by a decelerating rotor due to such bearing failure resulted in the pilot maneuvering the aircraft into a hazardous condition. It is desirable, therefore, that a means be provided for warning the pilot that such a condition is imminent.

Experience in running life tests on rotors of gyroscopes has shown that bearing failure is not characterized by sudden decelerations from a normal operating speed, but instead is evidenced by a gradual reduction in the running speed of the gyroscope rotor over a period of a few days up to a point where the bearings may become degraded to the extent where they seize causing abnormal deceleration with resulting rapid precession of the gyroscope. A solution of the problem presented is to provide means to sense a reduced running speed of the electric motor driving the gyroscope rotor and to use this sensing means to effect an electrical signal for providing a warning of impending bearing failure.

Heretofore, in the use of electric motors operating at synchronous speeds or at little slip for driving a gyroscope rotor, it has been a requirement to have means available to determine that the rotational velocity thereof is as required. Thus, for example, many gyroscopes, for missile or aircraft use, require means for effecting a self-test of the gyroscope, including means for measuring the speed of rotation of the gyroscope rotor. In most instances, the rotor of the gyroscope is mounted in a sealed case and is not readily accessible.

Methods and means have been heretofore provided to sense the rotation of the gyroscope motor or rotor driven thereby so as to produce a signal which is a function of the magnitude of the angular velocity of the motor. Such means may effect a measure of the velocity of the rotor of the gyro through the provision of magnetic material in the rotating mass of the rotor of the gyroscope cooperating with an appropriate sensing coil so that the voltage or frequency of the current induced thereby in the sensor coil may be utilized as a measure of the rotational speed of the rotor of the gyroscope. Such a self-test mechanism for an angular rate gyroscope is disclosed and claimed in a copending U.S. application Serial No. 208,998, filed July 11, 1962, by John J. Haring, and assigned to The Bendix Corporation.

The self-test mechanism disclosed in the last-mentioned copending application requires the use of certain additional component parts within the gyroscope case including a sensor coil and a plurality of permanent magnetic rods positioned in equal spaced relation about the periphery of the rotor of the gyroscope.

There are, however, certain potential disadvantages in the use of such parts, for example, the use of the magnetic rods in the periphery of the rotor of the gyroscope may have an adverse effect upon the output signal from an A.C. transducer positioned adjacent to the rotor. Shielding does not always completely eliminate this effect and there may be a tendency of the associated sensor coil to retain magnetism and so produce an uncertain bias torque. While means may be made available to minimize this adverse effect, the same still remains, however, as a potential source of uncertainty.

In devices of the type described in the aforenoted copending application, there may be produced output voltages and/or frequencies proportional to the rotational velocity of the rotor of the gyroscope so that a small percentage change in the rotational velocity of the gyroscope rotor may produce an equivalent percentage change in the output signal from the self-test mechanism which may be difficult to sense to effect the required controlling action.

An object of the invention is to provide novel means to avoid the aforenoted potential shortcomings in the prior devices of the type described and claimed in the aforenoted copending U.S. application Serial No. 208,998.

Another object of the invention is to provide a novel self-test mechanism in which there may be required that no additional functional parts be added to the gyroscope and which additional parts might otherwise adversely effect the alternating current output signal from the transducer of the gyroscope or adversely effect the torquing of the gimbal thereof.

Another object of the invention is to provide a novel self-test means for the motor of the rotor of a gyroscope in which a small change or reduction in the velocity of the gyroscope rotor from a maximum velocity value, instead of causing a corresponding small percentage change in the resultant monitor signal, will cause in the self-test means of the present invention a monitor signal which in effect will be multiplied several fold in the event of even a small percentage change or reduction in the rotational velocity of the gyroscope rotor from the maximum velocity value.

Another object of the invention is to provide a novel means for effecting a monitor signal predicated on the basic concept that the impedance of the field windings of an electric motor operating at a speed in synchronism with or at a maximum speed relative to the rotational frequency of the alternating current supply is quite different from the impedance of the field windings of the motor when operating at a nonsynchronous speed or at a speed less than said maximum speed, even through the latter speed of the motor may differ by only a very slight value from the synchronous or maximum speed value.

Another object of the invention is to provide a novel bridge circuit in which field windings of the motor are operatively connected as one leg of a bridge circuit which is balanced to null at a speed of the motor in synchronism with the alternating current supply or at some maximum operating speed relative to the rotational frequency of the alternating current supply, and which bridge circuit is unbalanced when the motor is operating out of synchronism with the alternating current supply or at a speed less than said maximum speed so that the departure from the null will effect a signal voltage from the bridge circuit for operating suitable monitoring means to indicate the nonsynchronous or reduced speed condition of the motor.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

Figure 1:
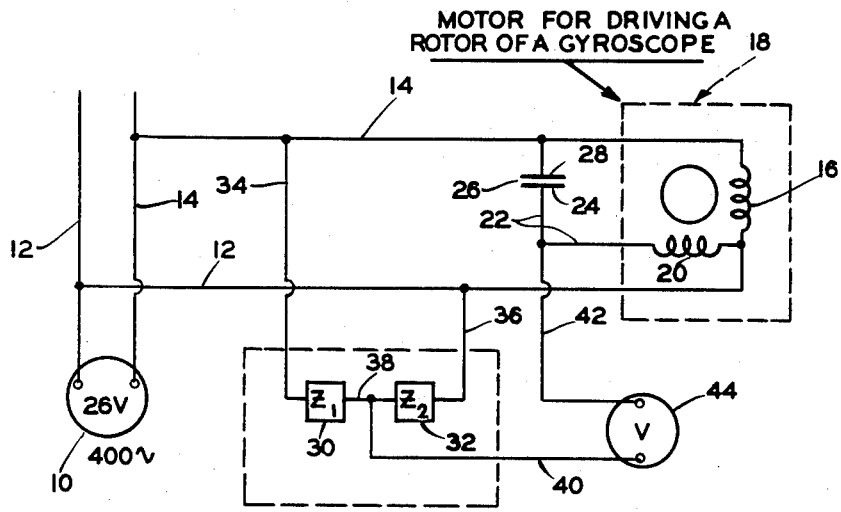
FIGURE 1 is a wiring diagram illustrating the novel monitor circuit of the present invention as applied to a conventional two-phase motor for driving the rotor of a gyroscope.

Referring to the drawing of FIGURE 1, there is indicated generally by the numeral 10 a suitable source of constant frequency alternating current which is applied across conductors 12 and 14 to a winding 16 of a two-phase motor indicated generally by the numeral 18 and having a second phase winding 20 connected at one end to the conductor 12 and at the opposite end through a conductor 22 to a plate 24 of a phase shifting capacitor 26 having another plate 28 connected to the conductor 14.

The field winding 20 of the motor 18 is connected in one arm of a bridge circuit including in the other arms thereof a capacitor 26, an impedance ($Z_1$) 30 which may be a suitable resistance, impedance winding or capacitor, and an impedance ($Z_2$) 32 which may be a suitable resistance, impedance winding or capacitor. The impedance 30 is connected at one end through a conductor 34 to the conductor 14 while the impedance 32 is connected at one end through a conductor 36 to the conductor 12. The other ends of the impedances 30 and 32 are in turn interconnected through a conductor 38. Output conductors 40 and 42 of the bridge circuit lead from the conductors 22 and 38 to a voltmeter 44 of conventional type.

The input of the bridge circuit is then applied across the conductors 12 and 14 while the output from the bridge circuit is applied through the conductors 40 and 42 to the voltmeter 44.

The impedances 30 and 32 are so selected that the bridge circuit is balanced and the output across conductors 40 and 42 is at a null when the motor 18 driving the gyroscope rotor is driven at synchronous speed relative to the rotational frequency of the A.C. supply 10. The voltage then applied across the output lines 40 and 42 to the voltmeter 44 will then be null. However, when the speed of the motor 18 is reduced so as not to operate at a speed in synchronism with the alternating current supply 10, the bridge circuit becomes unbalanced due to a resulting change in the impedance of the motor winding 20 whereupon the electromotive force applied across the output lines 40 and 42 reaches a finite value which will be sensed by the voltmeter 44 to give an indication to the operator of the reduced speed of operation of the motor 18 and that the motor 18 for driving the gyro rotor is not operating at a speed in synchronism with the alternating current supply applied across the lines 12 and 14 from the source 10.

The extent of this reduced speed will be indicated by the value of the voltage applied across the output lines 40 and 42 which will increase with the reduction in the speed of the motor 18, as indicated by the voltmeter 44 so that the pilot may determine therefrom when a critical point in the condition of the rotor bearing has been reached.

*Second Form of the Invention*

Figure 2:
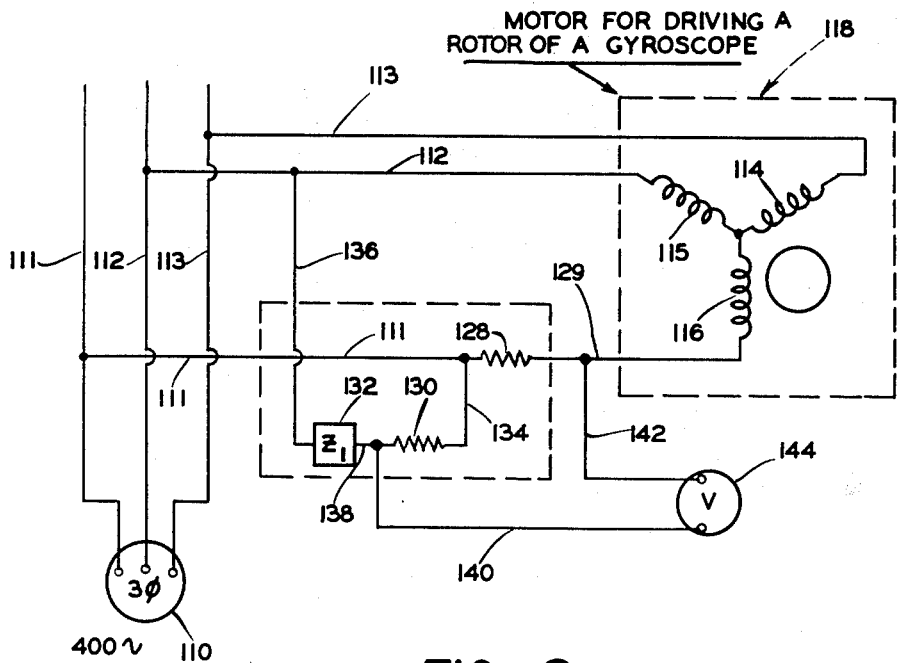
FIGURE 2 is a schematic wiring diagram illustrating the novel monitoring circuit of the present invention as applied to a conventional three-phase motor for driving the rotor of a gyroscope.

Referring now to the form of the invention, as shown in FIGURE 2, there is indicated by the numeral 110, a source of constant frequency three-phase alternating current electrical energy which is applied across the lines 111, 112, and 113 and in turn to the three-phase field windings 114, 115, and 116 of a three-phase motor 118 which may be utilized to drive the rotor of a gyroscope in a conventional manner.

The field windings 115 and 116 of the motor 118 are connected in one arm of a bridge circuit including in the second and third arms thereof resistor elements 128 and 130, and in the fourth arm an impedance element ($Z_1$) 132 which may be a suitable resistance, impedance winding or capacitor.

The resistor element 128 is connected at one end to the conductor 111 and at the other end through a conductor 129 to the field winding 116. The resistor element 130 is connected at one end by a conductor 134 to the conductor 111 while the impedance element 132 is connected at one end by a conductor 136 to the conductor 112. The other ends of the elements 130 and 132 are interconnected by a conductor 138. Output conductors 140 and 142 of the bridge circuit lead from the conductor 138 and the conductor 129, respectively, to a voltmeter 144.

The input to the bridge circuit is applied then across the conductors 111 and 112 while the output from the bridge circuit is applied across the conductors 140 and 142 to the voltmeter 144.

In the bridge circuit, the resistor element 128 may be selected of a sufficiently low value so as not to adversely effect the operation of the motor 118 while the elements 130 and 132 as well as element 128 may be so selected in relation to the field windings 115 and 116 that the bridge circuit is balanced when the motor 118 of the gyroscope is driven at a speed in synchronism with the three-phase alternating current supply provided by the source 110. Thereupon, the electromotive force applied across conductors 140 and 142 to the voltmeter 144 will be at a null value.

However, when the speed of the motor 118 is reduced so as to be out of synchronism with the alternating current supply 110, the impedance of the field windings 115 and 116 in the one leg of the bridge circuit will rapidly change so as to unbalance the bridge circuit whereupon a sizeable voltage will appear across the output lines 140 and 142 which will increase with the reduction in the speed of the motor 118 and be applied to the voltmeter 144 so as to thereupon immediately give an indication of the extent of the reduced speed condition of the motor in response to said voltage and from which it may be readily seen by the operator that the motor 118 is operating under such reduced speed nonsynchronous condition as to indicate that a failure in the rotor bearings of the gyroscope may be imminent.

*Third Form of the Invention*

Figure 3:
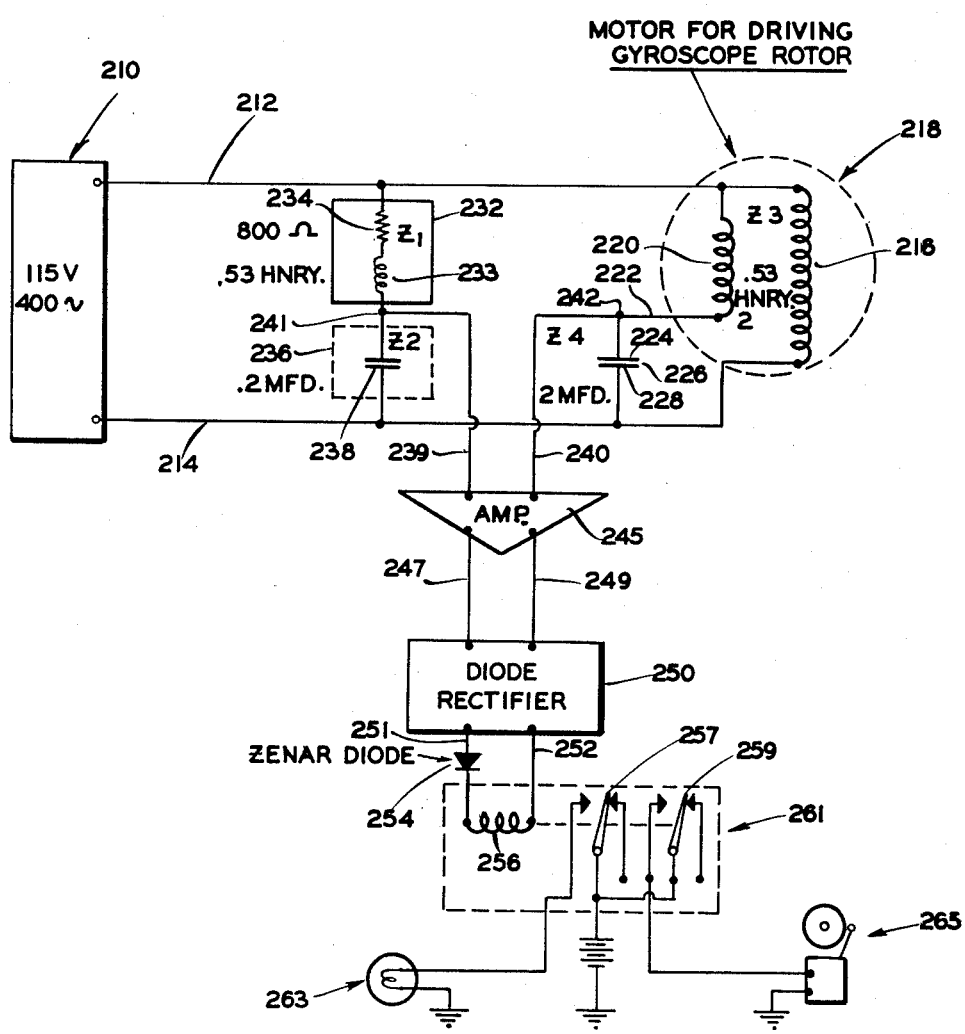
FIGURE 3 is a schematic wiring diagram of a third form of a novel monitoring circuit embodying the invention.

Referring now to the modified form of the invention, as shown in FIGURE 3, there is indicated by the numeral 210 a suitable source of constant frequency alternating current of, for example, 115 volts, 400 cycles which is applied across conductors 212 and 214 to a winding 216 of a two-phase motor indicated generally by the numerals 218, and having a second phase winding 220 connected at one end to the conductor 212 and at an opposite end through a conductor 222 to a plate 224 of a phase shifting capacitor 226 having another plate 228 connected to the conductor 214.

The field winding 220 of the motor 218 is connected in one arm of a bridge circuit including as a second arm the phase shifting capacitor 226, and an impedance ($Z_1$) 232 as a third arm thereof. The impedance ($Z_3$) of the motor winding 220 is balanced by the impedance ($Z_1$) 232. The impedance 232 may consist of a matching inductor 233 of, for example, .53 henries and an 800 ohm resistor 234. This resistor 234 may be suitably trimmed for matching purposes. In a fourth arm 236, there is provided an impedance ($Z_2$) 236 which may be a .2 microfarad capacitor 238 which is arranged to balance the phase shifting capacitor 226 also of .2 microfarad.

Output conductors 239 and 240 lead from points 241 and 242 in the bridge circuit. The point 241 is at a point between the impedance 232 and 236 of the third and fourth arms of the bridge circuit and the point 242 is between impedance 220 and 226 of the first and second arms of the bridge circuit. The input of the bridge circuit is applied through the conductors 212 and 214 to points in the bridge circuit between the impedances 220 and 232 of the first and third arms and the impedances 226 and 236 of the second and fourth arms, respectively.

The output leads from the points 241 and 242 lead to a suitable amplifier 245 which has output conductors 247 and 249 leading in turn to the input of a diode rectifier 250 having output conductors 251 and 252 connected through a zener diode 254 to a relay winding 256 controlling the relay contact switches 257 and 259 of the relay indicated generally by the numeral 261.

The relay switch arm 257 may be arranged to control suitable low speed condition warning means such as a visual indicator or lamp 263 while the relay switch arm 259 may be arranged to control other suitable low speed condition warning means or an audible indicator such as a whistle, siren or bell 265.

Figure 4:
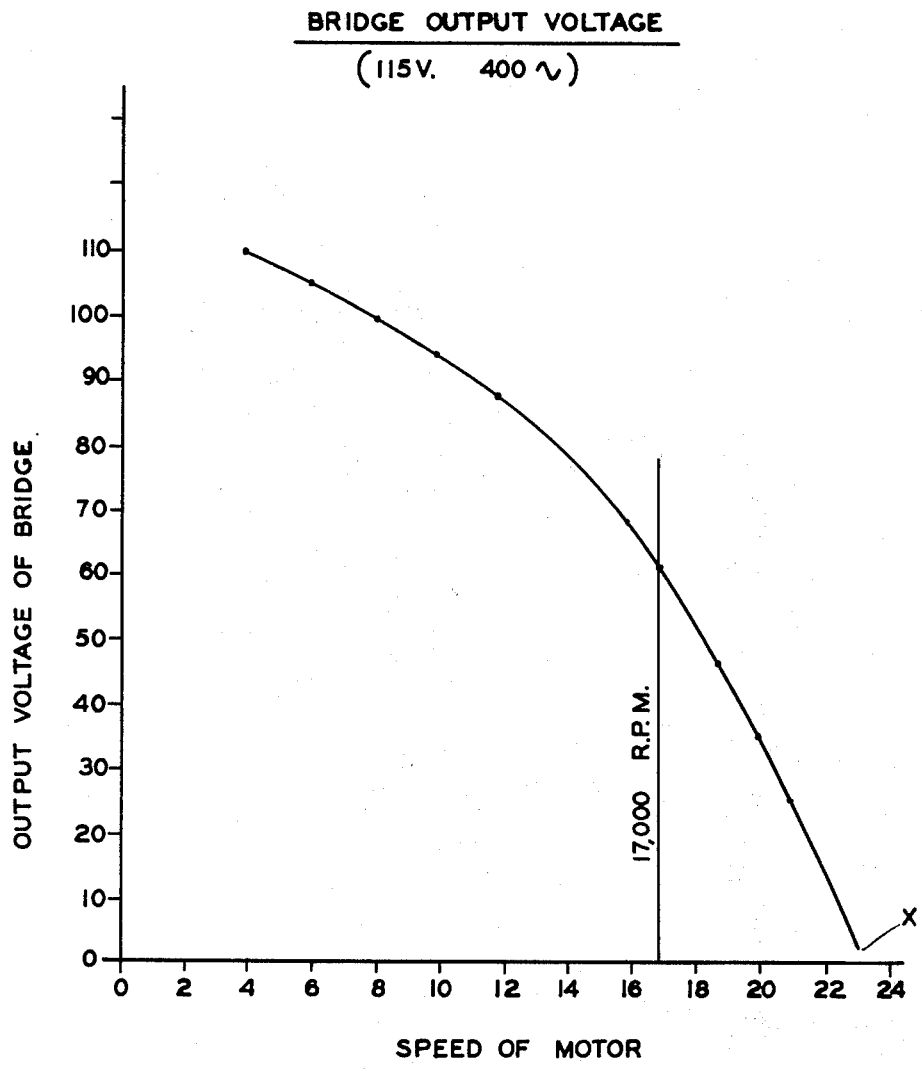
FIGURE 4 is a graphical illustration of a typical voltage output from the bridge circuit of FIGURE 3 when operating at a maximum speed of the motor of, for example, 23,000 r.p.m. which may be slightly less than a synchronous speed of 24,000 r.p.m.

From the foregoing, it will be seen that the impedances 220, 226, 232, and 236 form a bridge circuit in which the impedances ($Z_3$) of the motor winding 220 may change with changes in the speed of the motor 218. The impedances 220, 226, 232, and 236 of the bridge are so arranged as to balance the bridge when the gyro motor 218 is operating at a full or maximum speed of, for example, 23,000 r.p.m., at which speed the null output of the bridge circuit applied across the lines 239 and 240, as shown graphically in the drawing of FIGURE 4, is indicated by the letter X. At this full or maximum speed, the field winding 220 of the motor 218 has an inductance of, for example, .53 henries. In series with the impedance ($Z_3$) of the winding 220 in the impedance ($Z_4$) of the phase shifting capacitor 226 having a capacitance of .2 microfarad.

In the aforenoted bridge, impedance ($Z_1$) 232 will be matched to the impedance ($Z_3$) of the winding 220 and the impedance ($Z_2$) of the capacitor 238 will be matched to the impedance ($Z_4$) of the capacitor 226. The null output of the bridge taken from the points 241 and 242 with the gyro motor 218 operating at the full or maximum speed of, for example, 23,000 r.p.m. would be at a very low value of 1.75 volts. Upon the rotor driven by the motor 218 being braked or slowed down to 17,000 r.p.m., the output of the bridge across lines 239 and 240 would be of a higher voltage of, for example, 60 volts, as shown for example, by the graph of FIGURE 4 which illustrates the relationship between the bridge output voltage vs. the speed (r.p.m.) of the gyro motor 218.

The speed of 17,000 r.p.m. may be taken as the point at which the visual alarm 263 or audible alarm 265 is brought into operation. Above this speed of rotation of the gyro motor 218, it has been found that the gyro motor 218 will perform safely. However, the alarm point may be changed to meet the particular requirements of the gyroscope under consideration.

The output of the amplifier 245 wil be rectified by the diode rectifier 250 and the D.C. voltage operated relay 261 will have a small spread between the pull in and drop out requirements of the relay coil 256. This may be accomplished by the zener diode 254 in series with the coil 256 of the relay 261. A pull in to drop out ratio of the relay 261 is arranged so as to be less than 10 percent. This percentage again may be reduced if desired. The relay contacts 257 and 259 operated by the relay coil 256 will be operated so as to effect energization of the visual and audible alarms 253 and 265 at the required critical speed of the gyro motor 218, as shown graphically in FIGURE 4.

It will be seen from the foregoing that there has been provided novel means for monitoring the speed of the gyro motor 218 when it falls below a preselected r.p.m. so that an advance warning of rotor bearing failure may be provided.

Thus there is provided an arrangement which requires no additional components to be added to the conventional gyro motor rotor which might otherwise adversely effect the operation thereof and an arrangement which may be utilized to modify a conventional energizing system for the motor of a gyroscope rotor and a speed level indicator means which may be provided at a reasonable cost.

Although several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Means for monitoring the operating speed of an electric motor normally operating at a selected maximum speed relative to the frequency of an alternating current source, and said motor having a plurality of field windings energized from said alternating current source; said monitoring means comprising a bridge circuit including at least one of said field windings in an arm thereof, and electrical input lines to siad bridge circuit operatively connected to said alternating current source, output lines from said bridge circuit, and electrical condition indicator means operatively connected to said output lines, said bridge circuit being so arranged as to be normally balanced upon operation of said electric motor at said selected speed, and upon the motor operating at a slower speed than said selected speed the impedance of the field windings of said motor may be effectively changed so as to unbalance the bridge circuit whereupon the electrical condition indicator means becomes effective to indicate said slower speed condition of the motor.

2. The combination defined by claim 1 including the alternating current source providing a three-phase source of electrical energy, and the electric motor including three field windings operatively connected to said three-phase source, and means operatively connecting two of said field windings in an arm of said bridge circuit.

3. The combination defined by claim 1 including said electric motor being of a two-phase type including two field windings, and means operatively connecting one of said field windings in an arm of said bridge circuit so as to be effective to unbalance the bridge circuit upon operation of the motor at a slower speed than said selected speed.

4. Means for monitoring the operating speed of an electric motor normally operating at a speed in synchronism with an alternating current source, said electric motor being of a two-phase type having a first field winding and a second field winding, said first field winding being operatively connected across said source, and means including a phase shifting capacitor for operatively connecting said second field winding across said source; said monitoring means comprising a bridge circuit including means operatively connecting said second field winding in one arm thereof and said capacitor in a second arm of said bridge circuit, a pair of impedances, means operatively connecting said impedances across said alternating current source, said pair of impedances providing third and fourth arms of said bridge circuit, said bridge circuit being balanced during operation of the motor in synchronism with the alternating current source, and a pair of output conductors leading from a point between said capacitor and second field winding, the other of said output conductors leading from a point between said pair of impedances of the third and fourth arms of the bridge circuit, a voltmeter operatively connected across said output conductors, said bridge circuit being effective to become unbalanced upon said motor operating at a speed in nonsynchronism with the alternating current source so that the impedance of the second field winding may be so changed as to effectively unbalance the bridge circuit to cause an output voltage to be applied across said output conductors to the voltmeter for indicating the nonsynchronous speed condition of the motor.

5. Means for monitoring the operating speed of an electric motor normally operated in synchronism with a three-phase alternating current source, and said motor being of a three-phase type having three windings operatively connected to said alternating current source; said monitoring means comprising a bridge circuit including two of said phase windings in an arm thereof, a resistor and a conductor leading from one terminal of the three-phase source to one of said field windings and providing a second arm of the bridge circuit, a pair of impedances connected across the two field windings of said motor and providing third and fourth arms of said bridge circuit, and a pair of electrical output conductors leading from said bridge circuit, one of said output conductors leading from a point between said pair of impedances, and another of said output conductors leading from a point between said resistor of said second arm and said one field winding of said motor, and a voltmeter operatively connected across the output conductors to sense an unbalanced condition of the bridge circuit upon the motor operating at a speed in nonsynchronism with the alternating current source.

6. A device for monitoring speed of an electric motor normally operating within a first high speed range relative to a supply of constant frequency pulsating electrical energy, said motor being of a type including field windings energized from said supply and having impedances varying with speed of the motor; said monitoring device comprising means for sensing a change in an impedance of at least one of said windings, and means operative by said sensing means for warning of operation of the motor within a second low speed range.

7. The combination defined by claim 6 in which said sensing means includes a bridge circuit having an electrical input connected to said supply of electrical energy and being so electrically unbalanced upon operation of the motor within said second low speed range as to apply to said warning means an electrical signal to render the warning means effective.

8. A device for warning of a change in speed of an electric motor normally driven at a selected maximum speed relative to a supply of constant frequency pulsating electrical energy, said motor being of a type including field windings energized from said supply of electrical energy, and said field windings having impedances changing upon the motor being driven at a speed less than said selected maximum speed; said device comprising means responsive to said change in the impedance of at least one of said field windings for effecting an electrical output signal, and means operative by said electrical output signal for warning of the speed condition of the motor.

9. The combination defined by claim 8 in which said last-mentioned means includes a relay device effective upon said electrical output signal exceeding a predetermined value for warning of a speed condition of the motor within a predetermined low speed range indicative of imminent bearing failure.

10. Means for monitoring the operating speed of an electric motor normally operating within a predetermined maximum speed range relative to the frequency of an alternating current source, and said motor having a plurality of field windings energized from said alternating current source; said monitor means comprising a bridge circuit including at least one of said field windings in an arm thereof, electrical input conductors to said bridge circuit operatively connected to said alternating current source, electrical output conductors from said bridge circuit, and electrical condition indicator means operatively connected to said output conductors, the field windings of said motor having impedances effectively changed upon the motor operating within a slower speed range than said selected maximum speed range so as to provide an electrical output signal across said output lines in excess of a predetermined value, and said electrical condition indicator means including means responsive to said electrical output signal and effective upon said signal exceeding said predetermined value for causing said electrical condition indicator means to indicate a speed condition of the motor within said slower speed range and indicative of an imminent bearing failure in said motor.

11. Means for monitoring the operating speed of an electric motor normally operating within a selected maximum speed range relative to the frequency of an alternating current source, said motor being of a two-phase type having a first field winding and a second field winding, said first field winding being operatively connected across said source, means including a phase shifting capacitor for operatively connecting said second field winding across said source; said monitoring means comprising a bridge circuit including said second field winding being operatively connected in one arm thereof, said capacitor being operatively connected in a second arm of said bridge circuit, an inductive means providing a third arm of said bridge circuit and a second capacitor providing a fourth arm of the bridge circuit and arranged to balance the first-mentioned phase shifting capacitor of the second arm of the bridge circuit, output conductors leading from points in the bridge circuit between the first and second arms of the bridge circuit and the third and fourth arms of the bridge circuit, respectively, input conductors to the bridge circuit leading from the alternating current source to points in the bridge circuit between the first and third arms and the second and fourth arms of the bridge circuit, respectively, amplifier means having an input operatively connected to the output conductors from said bridge circuit, rectifier means operatively connected to an output from the amplifier means, relay means operatively connected to the output of the rectifier means, warning means operative by the relay means, said second field winding having an impedance varying with the speed of the motor and so arranged that upon the motor operating at a speed below said normal maximum speed range there may be effected across the output conductors of the bridge circuit an electrical signal applied through said amplifier and rectifier means to said relay means to cause the relay means to render the warning means effective to provide a warning of the low speed condition of the motor indicative of an imminent bearing failure in the motor.

References Cited in the file of this patent

UNITED STATES PATENTS

| | | |
|---|---|---|
| 2,200,819 | Bohannon | May 14, 1940 |
| 2,429,257 | Bond | Oct. 21, 1947 |
| 2,732,520 | Couanault | Jan. 24, 1956 |
| 2,799,819 | Brown | July 16, 1957 |
| 3,038,150 | Bechberger | June 5, 1962 |